US012609309B2

(12) United States Patent (10) Patent No.: US 12,609,309 B2
Nishizaki et al. (45) Date of Patent: Apr. 21, 2026

(54) LITHIUM COMPOSITE OXIDE SINTERED PLATE AND ALL-SOLID-STATE SECONDARY BATTERY

(71) Applicant: NGK INSULATORS, LTD., Nagoya (JP)

(72) Inventors: Tsutomu Nishizaki, Nagoya (JP); Mizuki Hirose, Nagoya (JP); Yoshimasa Kobayashi, Nagoya (JP); Yuji Katsuda, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 520 days.

(21) Appl. No.: 18/328,903

(22) Filed: Jun. 5, 2023

(65) Prior Publication Data

US 2023/0307625 A1 Sep. 28, 2023

Related U.S. Application Data

(63) Continuation of application No. PCT/JP2020/048035, filed on Dec. 22, 2020.

(51) Int. Cl.
| | |
|---|---|
| *H01M 4/525* | (2010.01) |
| *H01M 4/02* | (2006.01) |
| *H01M 4/131* | (2010.01) |
| *H01M 4/505* | (2010.01) |
| *H01M 4/58* | (2010.01) |
| *H01M 10/0525* | (2010.01) |
| *H01M 10/0562* | (2010.01) |

(52) U.S. Cl.
CPC ............ *H01M 4/525* (2013.01); *H01M 4/131* (2013.01); *H01M 4/505* (2013.01); *H01M 4/5825* (2013.01); *H01M 10/0525* (2013.01); *H01M 10/0562* (2013.01); *H01M 2004/021* (2013.01); *H01M 2004/027* (2013.01); *H01M 2004/028* (2013.01); *H01M 2300/0068* (2013.01); *H01M 2300/0071* (2013.01)

(58) Field of Classification Search
None
See application file for complete search history.

(56) References Cited

U.S. PATENT DOCUMENTS

| | | |
|---|---|---|
| 11,515,570 B2 | 11/2022 | Takeuchi et al. |
| 2004/0179993 A1 | 9/2004 | Dahn et al. |
| 2020/0259217 A1 | 8/2020 | Yura et al. |
| 2021/0036305 A1 | 2/2021 | Yura et al. |
| 2021/0202929 A1 | 7/2021 | Yura |

FOREIGN PATENT DOCUMENTS

| | | | |
|---|---|---|---|
| JP | 2006-520525 A | 9/2006 | |
| JP | 2018-206609 A | 12/2018 | |
| WO | 2015/151566 A1 | 10/2015 | |
| WO | 2019/093222 A1 | 5/2019 | |
| WO | WO-2019093221 A1 * | 5/2019 | ........ H01M 10/0562 |
| WO | 2019/221140 A1 | 11/2019 | |
| WO | 2020/090470 A1 | 5/2020 | |

OTHER PUBLICATIONS

Takeuchi et al., WO 2019093221 A1, English Translation from FIT (Year: 2019).*
Extended European Search Report dated Sep. 9, 2024 (Application No. 20966851.6).
International Search Report and Written Opinion (Application No. PCT/JP2020/048035) dated Mar. 23, 2021 (with English translation) (11 pages).

* cited by examiner

*Primary Examiner* — Colin W. Slifka
(74) *Attorney, Agent, or Firm* — BURR PATENT LAW, PLLC

(57) ABSTRACT

There is provided a lithium composite oxide which is composed of a lithium composite oxide having a layered rock salt structure containing Li, Ni, Co and Mn. The lithium composite oxide sintered plate has a porosity of 20 to 40%, a mean pore diameter of 3.5 μm or larger and an interfacial length per 1 μm² of unit cross-sectional area of 0.45 μm or shorter.

10 Claims, No Drawings

LITHIUM COMPOSITE OXIDE SINTERED PLATE AND ALL-SOLID-STATE SECONDARY BATTERY

CROSS-REFERENCE TO RELATED APPLICATION

This application is a continuation application of PCT/JP2020/048035 filed Dec. 22, 2020, the entire contents all of which are incorporated herein by reference.

BACKGROUND OF THE INVENTION

1. Field of the Invention

The present invention relates to a lithium composite oxide sintered plate to be used for a positive electrode of a lithium ion secondary battery, and an all-solid-state secondary battery.

2. Description of the Related Art

As a positive electrode active material layer for lithium ion secondary batteries, there is broadly known a positive electrode of a dispersed power type obtained by kneading and shaping a powder of a lithium composite oxide (typically, a lithium transition metal oxide) and additives such as a binder and an electrically conductive agent. Since the positive electrode of a dispersed power type contains a relatively large amount (for example, about 10% by weight) of a binder not contributing to the capacity, the filling density of the lithium composite oxide as its positive electrode active material is low. The positive electrode of a dispersed power type thus has large room for improvement in the capacity and the charge/discharge efficiency. Then, an attempt is made to improve the capacity and the charge/discharge efficiency by constituting the positive electrode or the positive electrode active material layer of a lithium composite oxide sintered plate. In this case, since the positive electrode or the positive electrode active material layer contains no binder, the filling density of the lithium composite oxide becomes high, whereby a high capacity and a good charge/discharge efficiency are expected to be attained.

In addition, in lithium ion secondary batteries, a liquid electrolyte (electrolytic solution) using a flammable organic solvent as a diluting solvent is conventionally used as a medium for allowing ions to migrate. In batteries using such an electrolytic solution, problems might be posed such as leakage, inflammation and explosion of an electrolytic solution. In order to solve such problems and secure essential safety, all-solid-state batteries are under development in which a solid electrolyte is used in place of a liquid electrolyte and all of other elements are composed of solids. Since the electrolyte is a solid, the all-solid-state batteries have no possibility of inflammation, cause no leakage and are less likely to pose problems such as deterioration of battery performance due to corrosion.

There are proposed various all-solid-state batteries using a sintered electrode and a solid electrolyte. For example, Patent Literature 1 (WO2019/093222A1) discloses an all-solid-state lithium battery including an oriented positive electrode plate which is a lithium composite oxide sintered plate having a void ratio of 10 to 50%, a negative electrode plate which contains Ti and is capable of intercalating and deintercalating lithium ions at 0.4 V (vs. Li/Li$^+$) or higher, and a solid electrolyte which has a lower melting point than the melting point or the decomposition temperature of the oriented positive electrode plate or the negative electrode plate. In the literature, as solid electrolytes having such a low melting point, various materials are disclosed such as $Li_3OCl$, and $xLiOH \cdot yLi_2SO_4$ wherein x+y=1, $0.6 \leq x \leq 0.95$ (for example, $3LiOH \cdot Li_2SO_4$). Such a solid electrolyte can be allowed to penetrate as a melt into voids of an electrode plate and can attain a firm interfacial contact. As a result, it is reportedly possible to attain a remarkable improvement in the battery resistance and the rate performance in charge/discharge, and a large improvement in the yield in the battery production. In addition, Patent Literature 2 (WO2015/151566A1) discloses an all-solid-state lithium battery having an oriented positive electrode plate which has a layered rock salt structure of a basic composition represented by $Li_p(Ni_x,Co_y,Mn_z)O_2$ wherein $0.9 \leq p \leq 1.3$, $0 < x < 0.8$, $0 < y < 1$, $0 \leq x \leq 0.7$, x+y+z=1, a solid electrolyte layer composed of a Li—La—Zr—O-based ceramic material and/or a lithium phosphate oxynitride (LiPON)-based ceramic material, and a negative electrode layer.

CITATION LIST

Patent Literature

Patent Literature 1: WO2019/093222A1
Patent Literature 2: WO2015/151566A1

SUMMARY OF THE INVENTION

The present inventors have a finding that among the above-mentioned low-melting point solid electrolytes, particularly, a $LiOH \cdot Li_2SO_4$-based solid electrolyte such as $3LiOH \cdot Li_2SO_4$ exhibits a high lithium ionic conductivity. However, when a cell is constituted by using the $LiOH \cdot Li_2SO_4$-based solid electrolyte such as $3LiOH \cdot Li_2SO_4$ for a sintered electrode as disclosed in Patent Literature 1 and its battery is operated, it has become clear that the discharge capacity became lower than the theoretical capacity estimated from the amount of an active material.

The present inventors have now found that in a lithium composite oxide sintered plate to be used for a positive electrode of a lithium ion secondary battery, the discharge capacity can largely be improved by controlling the microstructure (particularly, pores) of the lithium composite oxide sintered plate.

Therefore, an object of the present invention is to provide a lithium composite oxide sintered plate capable of largely improving the discharge capacity when incorporated as a positive electrode in a lithium ion secondary battery.

According to an aspect of the present invention, there is provided a lithium composite oxide sintered plate to be used for a positive electrode of a lithium ion secondary battery, wherein the lithium composite oxide sintered plate is composed of a lithium composite oxide having a layered rock salt structure containing Li, Ni, Co and Mn, and has:

a porosity of 20 to 40%, a mean pore diameter of 3.5 μm or larger, and an interfacial length per 1 μm$^2$ of unit cross-sectional area of 0.45 μm or shorter.

According to another aspect of the present invention, there is provided an all-solid-state secondary battery, comprising:

a positive electrode layer containing the lithium composite oxide sintered plate;

a negative electrode layer containing a negative electrode active material; and

a LiOH·Li$_2$SO$_4$-based solid electrolyte interposed as a separator between the positive electrode layer and the negative electrode layer and filled also in pores of the lithium composite oxide sintered plate.

DETAILED DESCRIPTION OF THE INVENTION

Definitions

Definitions of parameters to be used for specifying the present invention will be shown below.

The "porosity" herein is a volume ratio of pores in a sintered plate. The porosity can be measured by image analysis of a cross-sectional SEM image of the sintered plate. For example, the porosity (%) of a sintered plate may be determined by embedding a sintered plate in a resin; subjecting the resin-embedded sintered plate to cross-sectional polishing by ion milling; observing the polished cross-section by a SEM (scanning electron microscope) to acquire a cross-sectional SEM image (for example, a magnification of 500 to 1,000 times); and analyzing the acquired SEM image to calculate the proportion (%) of the area of parts filled with the resin in the total area consisting of parts of an electrode active material and the parts filled with the resin (parts which were pores originally). If the measurement can be carried out in a desired accuracy, the porosity may also be measured without embedding the sintered plate in the resin. For example, the measurement of the porosity of a sintered plate filled with a solid electrolyte in pores (a positive electrode plate taken out from an all-solid-state secondary battery) can be made in the state that the solid electrolyte remains filled.

The "mean pore diameter" herein is a mean value of the diameters of pores contained in a sintered plate of an electrode. The "diameter" is typically a length of a line segment bisecting the projected area of the pore (Martin diameter). In the present invention, the "mean value" calculated on the number base is suitable. The mean pore diameter can be measured by image analysis of a cross-sectional SEM image of the sintered plate. For example, the mean pore diameter of the sintered plate may be determined by analyzing the SEM image acquired in the above-mentioned porosity measurement to divide parts of an electrode active material from parts filled with a resin (parts which were pores originally) in a sintered plate; determining the maximum Martin diameter in each of regions of the parts filled with a resin; and calculating the mean value of the maximum Martin diameters as the mean pore diameter of the sintered plate. If the measurement can be carried out in a desired accuracy, the mean pore diameter may be measured without embedding the sintered plate in the resin. For example, the measurement of the mean pore diameter of a sintered plate filled with a solid electrolyte in pores (a positive electrode plate taken out from an all-solid-state secondary battery) can be made in the state that the solid electrolyte remains filled.

The "interfacial length per 1 μm$^2$ of unit cross-sectional area" herein is a total length of all the interfaces between pores and the active material contained in the unit cross-sectional area of a sintered plate, per 1 μm$^2$ of unit cross-sectional area of the sintered plate. The interfacial length can be measured by image analysis of a cross-sectional SEM image of the sintered plate. For example, The interfacial length per 1 μm$^2$ of unit cross-sectional area may be determined by analyzing the SEM image acquired in the above-mentioned porosity measurement, dividing parts of an electrode active material from parts filled with a resin (parts which were pores originally) in a sintered plate; determining the perimeter of all regions (that is, the total length of interfaces between the parts of a positive electrode active material and the parts filled with a resin) and the area of all regions analyzed (that is, regions composed of both of the parts of a positive electrode active material and the parts filled with a resin) in regions of the parts filled with a resin; and then dividing the perimeter by the area of all the analyzed regions to obtain the quotient as the interfacial length per 1 μm$^2$ of unit cross-sectional area. If the measurement can be carried out in a desired accuracy, the interfacial length may also be measured without embedding the sintered plate in the resin. For example, the measurement of the interfacial length of a sintered plate filled with a solid electrolyte in pores (a positive electrode plate taken out from an all-solid-state secondary battery) can be made in the state that the solid electrolyte remains filled.

Lithium Composite Oxide Sintered Plate

The lithium composite oxide sintered plate according to the present invention is used for a positive electrode of a lithium ion secondary battery. The lithium composite oxide sintered plate is composed of a lithium composite oxide having a layered rock salt structure containing Li, Ni, Co and Mn. Then, the lithium composite oxide sintered plate has a porosity of 20 to 40%, a mean pore diameter of 3.5 μm or larger and an interfacial length per 1 μm$^2$ of unit cross-sectional area of 0.45 μm$^2$ or shorter. In the lithium composite oxide sintered plate to be used for a positive electrode of a lithium ion secondary battery, the discharge capacity can largely be improved by controlling the microstructure (particularly, pores) of the lithium composite oxide sintered plate.

As described above, all-solid-state lithium batteries (for example, see Patent Literature 1) are known which employ a low-melting point solid electrolyte such as LiOH·Li$_2$SO$_4$-based solid electrolyte, and by making the solid electrolyte penetrate as a melt into voids of an electrode plate, the interfacial contact can be attained. As a result, it is reportedly possible to attain the improvement in the battery resistance and the rate performance in charge/discharge, and the improvement in the yield of battery production. However, when a cell is constituted by using the LiOH·Li$_2$SO$_4$-based solid electrolyte for a sintered electrode and its battery is operated, the discharge capacity becomes lower than the theoretical capacity estimated from the amount of an active material. It is considered that this is because the charge/discharge characteristic is adversely affected by the deterioration (lowering of conductivity) of the solid electrolyte due to the reaction of the positive electrode active material with the solid electrolyte, and the formation of a high-resistance layer becoming inhibitory to the Li ionic conduction at interfaces. With regard to this point, according to the present invention, by controlling the microstructure (particularly, pores) of a lithium composite oxide sintered plate, the above problems are solved or mitigated, and as a result, the discharge capacity is largely improved. In particular, a peculiar microstructure having a large mean pore diameter and a short interfacial length per unit cross-sectional area greatly contributes to the improvement in the discharge capacity. It is considered that this is because when the structure is the above peculiar microstructure, the elemental diffusion between the solid electrolyte and the sintered plate is suppressed and the reduction of the Li ionic conduction due to the degradation of the solid electrolyte is alleviated.

The lithium composite oxide sintered plate is composed of a lithium composite oxide having a layered rock salt structure containing Li, Ni, Co and Mn. In other words, the lithium composite oxide sintered plate has a structure in which a plurality of primary particles composed of the lithium composite oxide having a layered rock salt structure containing Li, Ni, Co and Mn are bound. The lithium composite oxide is one also called lithium cobaltate·nickelate·manganate, and abbreviated to NCM. The layered rock salt structure refers to a crystal structure in which a lithium layer and a transition metal layer other than lithium are alternately laminated with a layer of oxygen being sandwiched therebetween (typically, an $\alpha$-NaFeO$_2$-type structure: a structure in which a transition metal and lithium are orderly arranged in the [111] axis of the cubic rock salt-type structure). A typical NCM has a composition represented by $Li_p(Ni_x, Co_y, Mn_z)O_2$ wherein $0.9 \leq p \leq 1.3$, $0 < x < 0.8$, $0 < y < 1$, $0 \leq z \leq 0.7$, $x+y+z=1$; preferably, $0.95 \leq p \leq 1.10$, $0.1 \leq x < 0.7$, $0.1 \leq y < 0.9$, $0 \leq z \leq 0.6$, $x+y+z=1$, and is, for example, $Li(Ni_{0.5}Co_{0.2}Mn_{0.3})O_2$ and $Li(Ni_{0.3}Co_{0.6}Mn_{0.1})O_2$. Therefore, the molar ratio of Li/(Ni+Co+Mn) in the lithium composite oxide is preferably 0.95 to 1.10, more preferably 0.97 to 1.08 and still more preferably 0.98 to 1.05.

The porosity of the lithium composite oxide sintered plate is 20 to 40%, preferably 20 to 38%, more preferably 20 to 36% and still more preferably 20 to 33%. When the porosity is in such a range, pores can sufficiently be filled with a solid electrolyte and the proportion of a positive electrode active material in a positive electrode is increased in preparation of a battery, leading to achievement of a high energy density as a battery.

The mean pore diameter of the lithium composite oxide sintered plate is 3.5 µm or larger, preferably 3.5 to 15.0 µm, more preferably 3.5 to 10.0 µm and still more preferably 3.5 to 8.0 µm. Such a range leads to an increase of a solid electrolyte part (solid electrolyte part at distances apart from the interface) unsusceptible to deterioration due to side reactions between the solid electrolyte and the sintered plate. Hence, it is considered that the elemental diffusion between the solid electrolyte and the sintered plate is suppressed and the reduction of the Li ionic conduction due to the deterioration of the solid electrolyte is alleviated, whereby the discharge capacity is more effectively improved.

The interfacial length per 1 µm$^2$ of unit cross-sectional area in the lithium composite oxide sintered plate is 0.45 µm or shorter, preferably 0.10 to 0.40 µm, more preferably 0.10 to 0.35 µm and still more preferably 0.10 to 0.30 µm. Such a range leads to a reduction of the site where the sintered plate and the solid electrolyte cause side reactions. Hence, it is considered that the elemental diffusion between the solid electrolyte and the sintered plate is suppressed and the reduction of the Li ionic conduction due to the deterioration of the solid electrolyte is alleviated, whereby the discharge capacity is more effectively improved.

The thickness of the lithium composite oxide sintered plate is, from the viewpoint of the improvement in the energy density of a battery, and the like, preferably 30 to 300 µm, more preferably 50 to 300 µm and still more preferably 80 to 300 µm.

Method for Producing the Lithium Composite Oxide Sintered Plate

The lithium composite oxide sintered plate of the present invention may be one produced by any method, but is produced preferably through (a) preparation of an NCM raw material powder, (b) preparation of an NCM green sheet, and (c) firing the NCM green sheet.

(a) Preparation of an NCM Raw Material Powder

First, an NCM raw material powder is prepared. A preferable NCM raw material powder is a $Li(Ni_{0.5}Co_{0.2}Mn_{0.3})O_2$ powder or a $Li(Ni_{0.3}Co_{0.6}Mn_{0.1})O_2$ powder. The $Li(Ni_{0.5}Co_{0.2}Mn_{0.3})O_2$ powder can be prepared by mixing a $(Ni_{0.5}Co_{0.2}Mn_{0.3})(OH)_2$ powder and a $Li_2CO_3$ powder weighed to give a the molar ratio of Li/(Ni+Co+Mn) being 1.00 to 1.30, and firing the mixture at 700 to 1,200° C. (preferably 750 to 1,000° C.) for 1 to 24 hours (preferably 2 to 15 hours). Then, the $Li(Ni_{0.3}Co_{0.6}Mn_{0.1})O_2$ powder can be prepared by mixing a $(Ni_{0.3}Co_{0.6}Mn_{0.1})(OH)_2$ powder and a $Li_2CO_3$ powder weighed to give a molar ratio of Li/(Ni+Co+Mn) being 1.00 to 1.30, and firing the mixture at 700 to 1,200° C. (preferably 750 to 1,000° C.) for 1 to 24 hours (preferably 2 to 15 hours).

In order to attain the peculiar microstructure (particularly, pores) in the lithium composite oxide sintered plate of the present invention, it is preferable to use a mixed powder obtained by preparing a rather large-particle NCM raw material powder having a volume base D50 particle size of 3 to 20 µm (preferably 5 to 15 µm) and a rather small-particle NCM raw material powder having a volume base D50 particle size of 0.05 to 1 µm (preferably 0.1 to 0.6 µm), and mixing these. The proportion of the rather large-particle NCM raw material powder in the mixed powder of these large and small two kinds is preferably 50 to 99% by weight and more preferably 70 to 95% by weight. The rather small-particle NCM raw material powder may be prepared by milling the rather large-particle NCM raw material powder by well-known means such as a ball mill. At this time, it is preferable to add lithium borate ($Li_3BO_3$ or the like) or lithium sulfate ($Li_2SO_4$) to the rather small-particle NCM raw material powder for the purpose of sintering promotion. By thus adding a sintering aid, it becomes easy to attain a desired microstructure (interfacial length, pore diameter and the like) and as compare with no addition thereof, the firing temperature can also be made low. The amount of $Li_3BO_3$ or the like to be added to the rather small-particle NCM raw material powder is, with respect to the total amount of a mixed powder after the addition of $Li_3BO_3$, preferably 0.3 to 69% by weight and more preferably 1.5 to 51% by weight.

(b) Preparation of an NCM Green Sheet

An NCM raw material powder (preferably, the above-mentioned NCM mixed powder), a solvent, a binder, a plasticizer and a dispersant are mixed to make a paste. The resulting paste is regulated in viscosity and then shaped into a sheet form to prepare an NCM green sheet.

(c) Preparation of an NCM Sintered Plate

The NCM green sheet thus prepared is cut out into a desired size and shape, and placed in a firing sagger and fired. It is desirable that the firing is carried out by raising the temperature to 800 to 1,000° C. (preferably 850 to 970° C.) at a temperature-rise rate of 50 to 600° C./h (preferably 100 to 300° C./h) and holding the temperature for 1 to 24 hours (preferably 2 to 12 hours). The lithium composite oxide sintered plate (NCM sintered plate) is thus obtained.

All-Solid-State Secondary Battery

The lithium composite oxide sintered plate according to the present invention is used for a positive electrode of a lithium ion secondary battery (typically, an all-solid-state battery). Therefore, according to a preferable aspect of the present invention, there is provided an all-solid-state secondary battery having a positive electrode layer containing the lithium composite oxide sintered plate of the present invention, a negative electrode layer, and a $LiOH·Li_2SO_4$-based solid electrolyte. The negative electrode layer contains a negative electrode active material. The $LiOH·Li_2SO_4$-based solid electrolyte is interposed as a separator layer between the positive electrode layer and the negative electrode layer, and is filled also in pores of the lithium composite oxide sintered plate. The all-solid-state secondary battery containing, as a positive electrode layer, the lithium composite oxide sintered plate controlled in the microstructure (particularly, pores) can exhibit a higher discharge capacity than conventional all-solid-state secondary batteries using a $LiOH \cdot Li_2SO_4$-based solid electrolyte.

The negative electrode layer (typically, negative electrode plate) contains a negative electrode active material. As the negative electrode active material, a negative electrode active material usually used for lithium ion secondary batteries can be used. Examples of such usual negative electrode active materials include carbon-based materials and metals or semimetals such as Li, In, Al, Sn, Sb, Bi and Si, or alloys containing any thereof. Besides, oxide-based negative electrode active materials may be used.

An especially preferable negative electrode active material contains a material capable of intercalating/deintercalating lithium ions at 0.4 V (vs. $Li/Li^+$) or higher, and preferably contains Ti. A negative electrode active material meeting such a condition is preferably an oxide containing at least Ti. Preferable examples of such a negative electrode active material include lithium titanate $Li_4Ti_5O_{12}$ (hereinafter, referred to as LTO in some cases), a niobium titanium composite oxide $Nb_2TiO_7$ and titanium oxide $TiO_2$; more preferable are LTO and $Nb_2TiO_7$; and still more preferable is LTO. Here, LTO is known typically as having a spinel structure, but can assume another structure in charge/discharge. For example, with regard to LTO, the reactions in charge/discharge progress in the coexistence of two phases of $Li_4Ti_5O_{12}$ (spinel structure) and $Li_7Ti_5O_{12}$ (rock salt structure). Therefore, LTO is not limited to having a spinel structure.

The negative electrode may be in a form which is usually called a mixture electrode, and is made by shaping a mixture of a negative electrode active material, an electron conductive auxiliary, a lithium ionic conductive material, a binder and the like, but is preferably in a form of a sintered plate made by sintering a negative electrode raw material powder. That is, the negative electrode or the negative electrode active material is preferably in a form of a sintered plate. Since the sintered plate does not have to contain an electron conductive auxiliary or a binder, the energy density of the negative electrode can be increased. The sintered plate may be a compact body or a porous body, and a solid electrolyte may be contained in pores of the porous body.

The porosity of the negative electrode active material or the sintered plate thereof is preferably 20 to 45%, more preferably 20 to 40% and still more preferably 25 to 35%. When the porosity is in such a range, pores in the negative electrode active material can fully be filled with a solid electrolyte and the proportion of the negative electrode active material in the negative electrode increases, leading to achievement of a high energy density as a battery.

The thickness of the negative electrode active material or the sintered plate thereof is, from the viewpoint of the improvement in the energy density of a battery, and the like, preferably 40 to 410 μm, more preferably 65 to 410 μm, still more preferably 100 to 410 μm and especially preferably 107 to 270 μm.

The solid electrolyte is a $LiOH \cdot Li_2SO_4$-based solid electrolyte. The $LiOH \cdot Li_2SO_4$-based solid electrolyte is a composite compound of LiOH and $Li_2SO_4$; the typical composition is represented by the general formula: $xLiOH \cdot yLi_2SO_4$ wherein $x+y=1$, and $0.6 \le x \le 0.95$; and representative examples include $3LiOH \cdot Li_2SO_4$ (a composition in which in the above general formula, $x=0.75$ and $y=0.25$). Preferably, the $LiOH \cdot Li_2SO_4$-based solid electrolyte contains a solid electrolyte identified as $3LiOH \cdot Li_2SO_4$ by X-ray diffraction. This preferable solid electrolyte contains $3LiOH \cdot Li_2SO_4$ as its main phase. Whether or not $3LiOH \cdot Li_2SO_4$ is contained in the solid electrolyte can be confirmed by identification using 032-0598 in ICDD data base in an X-ray diffraction pattern. Here, "$3LiOH \cdot Li_2SO_4$" refers to one having a crystal structure which can be regarded as the same as that of $3LiOH \cdot Li_2SO_4$, and does not necessarily need to have the same crystal composition as $3LiOH \cdot Li_2SO_4$. That is, $3LiOH \cdot Li_2SO_4$ whose composition deviates from $LiOH:Li_2SO_4=3:1$ is, as long as having the same crystal structure as $3LiOH \cdot Li_2SO_4$, determined to be also included in the "$3LiOH \cdot Li_2SO_4$". Therefore, even a solid electrolyte (for example, $3LiOH \cdot Li_2SO_4$ in which boron is dissolved as a solid solution and which exhibits an X-ray diffraction peak shifted to the larger angle side) containing a dopant such as boron is, as long as being regarded as having the same crystal structure as $3LiOH \cdot Li_2SO_4$, herein determined to be referred to as $3LiOH \cdot Li_2SO_4$. Similarly, the solid electrolyte to be used in the present invention is allowed to contain inevitable impurities.

Therefore, the $LiOH \cdot Li_2SO_4$-based solid electrolyte may contain, other than $3LiOH \cdot Li_2SO_4$ as its main phase, heterophases. The heterophases may be ones containing a plurality of elements selected from Li, O, H, S and B, or may be ones consisting only of a plurality of elements selected from Li, O, H, S and B. Examples of the heterophases include LiOH, $Li_2SO_4$ and/or $Li_3BO_3$, originated from raw materials. These heterophases are conceivably unreacted raw materials remaining when $3LiOH \cdot Li_2SO_4$ is formed, but since the heterophases do not contribute to the lithium ionic conduction, it is desirable that the amount thereof other than $Li_3BO_3$ is small. Since it can be said that a heterophase containing boron like $Li_3BO_3$ can contribute to the improvement in retention of the lithium ionic conductivity after high-temperature long-time holding, the heterophase is allowed to be contained in a desired amount. It can be said that the solid electrolyte may be composed of a single phase of $3LiOH \cdot Li_2SO_4$ in which boron is dissolved as a solid solution.

It is preferable that the $LiOH \cdot Li_2SO_4$-based solid electrolyte (particularly, $3LiOH \cdot Li_2SO_4$) further contains boron. By making boron to be further contained in a solid electrolyte identified as $3LiOH \cdot Li_2SO_4$, the reduction of the lithium ionic conductivity can be significantly suppressed even after high-temperature long-time holding. It is presumed that boron is entrapped in any of sites of the crystal structure of $3LiOH \cdot Li_2SO_4$, and improves stability of the crystal structure to temperature. The molar ratio (B/S) of boron B to sulfur S contained in the solid electrolyte is preferably higher than 0.002 and lower than 1.0, more preferably 0.003 or higher and 0.9 or lower and still more preferably 0.005 or higher and 0.8 or lower. When the B/S is in the above range, the retention rate of the lithium ionic conductivity is enabled to be improved. Further when the B/S is in the above range, the content of unreacted heterophases containing boron decreases, and therefore the absolute value of the lithium ionic conductivity can be high.

The $LiOH \cdot Li_2SO_4$-based solid electrolyte may be a green compact made of a powder made by milling a melt-solidified body, but is preferably a melt-solidified body (that is, material heat melted and then solidified).

It is preferable that the $LiOH \cdot Li_2SO_4$-based solid electrolyte is filled also in pores of the negative electrode layer. The thickness (excluding portions of the solid electrolyte having entered pores of the positive electrode layer and the negative electrode layer) of the solid electrolyte layer is, from the viewpoint of the charge/discharge rate characteristic and the insulation of the solid electrolyte, preferably 1 to 500 μm, more preferably 3 to 50 μm and still more preferably 5 to 40 μm.

Production of an All-Solid-State Secondary Battery

Production of a lithium ion secondary battery (typically, all-solid-state battery) can be carried out, for example, by i) preparing a positive electrode (that is, the lithium composite oxide sintered plate of the present invention) and a negative electrode, and ii) sandwiching a solid electrolyte between the positive electrode and the negative electrode and applying pressure, heat and the like to unify the positive electrode, the solid electrolyte and the negative electrode. The positive electrode, the solid electrolyte and the negative electrode may be connected by another means. In this case, examples of means to form the solid electrolyte between the positive electrode and the negative electrode include means of placing a formed body or a powder of the solid electrolyte on one electrode, means of applying a paste of a solid electrolyte powder on the electrode by screen printing, means of collision solidifying a powder of the solid electrolyte on the electrode as a substrate by an aerosol deposition method or the like, and means of depositing a solid electrolyte powder on the electrode by electrophoresis to form a membrane.

EXAMPLES

The present invention will be described more specifically by way of the following Examples. In the following description, lithium composite oxides having a layered rock salt structure containing Li, Ni, Co and Mn, such as $Li(Ni_{0.5}Co_{0.2}Mn_{0.3})O_2$ and $Li(Ni_{0.3}Co_{0.6}Mn_{0.1})O_2$, are abbreviated to "NCM", while $Li_4Ti_5O_{12}$ is abbreviated to "LTO".

First, NCM raw material powders 1 to 10 were prepared in order to prepare positive electrode plates as described below. Then, the summary of features of these raw material powders is shown in Table 1.

[Preparation of an NCM Raw Material Powder 1]

A commercially available $(Ni_{0.5}Co_{0.2}Mn_{0.3})(OH)_2$ powder (mean particle size: 9 to 10 μm) and a commercially available $Li_2CO_3$ powder (mean particle size: 3 μm), which were weighed to give a molar ratio of Li/(Ni+Co+Mn) being 1.15, were mixed, and then held at 750° C. for 10 hours to obtain an NCM raw material powder 1. The volume base D50 particle size of the powder was 8 μm.

[Preparation of an NCM Raw Material Powder 2]

2.45% by weight (with respect to the total amount of the NCM raw material powder 1 and $Li_3BO_3$) of $Li_3BO_3$ was added to the NCM raw material powder 1, and regulated in the volume base D50 particle size to about 0.4 μm by wet milling in a ball mill, and then dried to obtain an NCM raw material powder 2.

[Preparation of an NCM Raw Material Powder 3]

9.2% by weight (with respect to the total amount of the NCM raw material powder 1 and $Li_3BO_3$) of $Li_3BO_3$ was added to the NCM raw material powder 1, and regulated in the volume base D50 particle size to about 0.4 μm by wet milling in a ball mill, and then dried to obtain an NCM raw material powder 3.

[Preparation of an NCM Raw Material Powder 4]

The NCM raw material powder 1 was regulated in the volume base D50 particle size to about 5.5 μm by wet milling in a ball mill, and then dried to obtain an NCM raw material powder 4.

[Preparation of an NCM Raw Material Powder 5]

A commercially available $(Ni_{0.3}Co_{0.6}Mn_{0.1})(OH)_2$ powder (mean particle size: 7 to 8 μm) and a commercially available $Li_2CO_3$ powder (mean particle size: 3 μm), which were weighed to give a molar ratio being Li/(Ni+Co+Mn) of 1.15, were mixed, and then held at 850° C. for 10 hours to obtain an NCM raw material powder 5. The volume base D50 particle size of the powder was 6.5 μm.

[Preparation of an NCM Raw Material Powder 6]

9.2% by weight (with respect to the total amount of the NCM raw material powder 5 and $Li_3BO_3$) of $Li_3BO_3$ was added to the NCM raw material powder 5, and regulated in the volume base D50 particle size to about 0.4 μm by wet milling in a ball mill, and then dried to obtain an NCM raw material powder 6.

[Preparation of an NCM Raw Material Powder 7]

16.8% by weight (with respect to the total amount of the NCM raw material powder 5 and $Li_3BO_3$) of $Li_3BO_3$ was added to the NCM raw material powder 5, and regulated in the volume base D50 particle size to about 0.4 μm by wet milling in a ball mill, and then dried to obtain an NCM raw material powder 7.

[Preparation of an NCM Raw Material Powder 8]

The NCM raw material powder 5 was regulated in the volume base D50 particle size to about 0.4 μm by wet milling in a ball mill, and then dried to obtain an NCM raw material powder 8.

[Preparation of an NCM Raw Material Powder 9]

The NCM raw material powder 5 was regulated in the volume base D50 particle size to about 4.3 μm by wet milling in a ball mill, and then dried to obtain an NCM raw material powder 9.

[Preparation of an NCM Raw Material Powder 10]

A commercially available $(Ni_{0.3}Co_{0.6}Mn_{0.1})(OH)_2$ powder (mean particle size: 7 to 8 μm) and a commercially available $Li_2CO_3$ powder (mean particle size: 3 μm), which were weighed to give a molar ratio of Li/(Ni+Co+Mn) being 1.15, were mixed, and then held at 950° C. for 10 hours; and the resulting powder was regulated in the volume base D50 particle size to about 1.9 μm by wet milling in a ball mill, and then dried to obtain an NCM raw material powder 10.

By using the above raw material powders 1 to 10, positive electrode plates and batteries were prepared as described below, and various evaluations were carried out.

Example 1

(1) Preparation of a Positive Electrode Plate
(1a) Preparation of an NCM Green Sheet First, the NCM raw material powders 1 and 2 were homogeneously mixed in a blend proportion of 80:20 (in weight ratio) as indicated in Table 1 to prepare an NCM mixed powder A. The mixed powder A was mixed with a solvent for forming a tape, a binder, a plasticizer and a dispersant. The viscosity of the resulting paste was regulated, followed by shaping into a sheet form on a PET film (polyethylene terephthalate) to prepare an NCM green sheet. The thickness of the NCM green sheet was regulated such that the thickness after firing is 100 μm.

(1b) Preparation of an NCM Sintered Plate

The NCM green sheet peeled off from the PET film was punched out into a circle of 11 mm in diameter with a punch, and placed in a firing sagger. The temperature was raised at a temperature-rise rate of 200° C./h up to 940° C. and held for 10 hours to carry out firing. The thickness of the resulting sintered plate was about 100 µm by SEM observation. A Au film (thickness: 100 nm) was formed as a current collector layer on one surface of the NCM sintered plate by sputtering. A positive electrode plate was thus obtained.

(2) Preparation of a Negative Electrode Plate (2a) Preparation of an LTO Green Sheet A commercially available $TiO_2$ powder (mean particle size: 1 µm or smaller) and a commercially available $Li_2CO_3$ powder (mean particle size: 3 µm), which were weighed to give a molar ratio of Li/Ti being 0.84, were mixed, and then held at 1,000° C. for 2 hours to obtain a powder composed of LTO particles. The powder was regulated in the mean particle size to about 2 µm by wet milling in a ball mill, and mixed with a solvent for forming a tape, a binder, a plasticizer and a dispersant. The viscosity of the resulting paste was regulated followed by shaping into a sheet form on a PET film to prepare an LTO green sheet. The thickness of the LTO green sheet was regulated such that the thickness after firing is 130 µm.

(2b) Preparation of an LTO Sintered Plate

The LTO green sheet peeled off from the PET film was punched out into a circle of 11 mm in diameter with a punch, and placed in a firing sagger. The temperature was raised at a temperature-rise rate of 200° C./h up to 850° C. and held for 2 hours to carry out firing. The thickness of the resulting sintered plate was about 130 µm by SEM observation. A Au film (thickness: 100 nm) was formed as a current collector layer on one surface of the LTO sintered plate by sputtering. A negative electrode plate was thus obtained.

(3) Preparation of a Solid Electrolyte (3a) Preparation of a Raw Material Mixed Powder A $Li_2SO_4$ powder (commercially available product, purity: 99% or higher), a LiOH powder (commercially available product, purity: 98% or higher) and $Li_3BO_3$ (commercially available product, purity: 99% or higher) were mixed so that $Li_2SO_4:LiOH:Li_3BO_3=1:2.6:0.05$ (in molar ratio) to obtain a raw material mixed powder. These powders were handled in a glove box in an Ar atmosphere and enough caution was taken so as not to cause deterioration such as moisture absorption.

(3b) Melting Synthesis

The raw material mixed powder was placed in an Ar atmosphere in a high-purity alumina-made crucible. The crucible was set in an electric furnace, and heat treated at 430° C. for 2 hours in an Ar atmosphere to prepare a melt. Successively, the melt was cooled at 100° C./h in the electric furnace to form a solidified material.

(3c) Milling in a Mortar

The resulting solidified material was milled in a mortar in a glove box in an Ar atmosphere to obtain a solid electrolyte powder having a volume base D50 particle size of 5 to 50 µm.

(4) Preparation of an All-Solid-State Battery

The solid electrolyte powder was placed on the positive electrode plate, and the negative electrode plate was placed thereon. A weight was further placed on the negative electrode plate, and heated at 400° C. for 45 min in an electric furnace. At this time, the solid electrolyte powder was melted and underwent subsequent solidification to form a solid electrolyte layer between the electrode plates. By using a cell composed of the resulting positive electrode plate/solid electrolyte/negative electrode plate, a battery was prepared.

(5) Evaluations (5a) Measurements of the Thickness and the Porosity

Measurements of the thickness and the porosity (% by volume) of each of the positive electrode plate prepared in the above (1) (the NCM sintered plate in the state of not containing the solid electrolyte) and the negative electrode plate prepared in the above (2) (the LTO sintered plate in the state of not containing the solid electrolyte) were carried out as follows. First, the positive electrode plate (or the negative electrode plate) was embedded in a resin and then subjected to cross-sectional polishing by ion milling. The polished cross-section was observed by SEM to acquire a cross-sectional SEM image. The thickness was calculated from the SEM image. SEM images for porosity measurement were taken as images in magnifications of 1,000 times and 500 times. The acquired images were subjected to a binarization process using image analysis software (manufactured by Media Cybernetics, Inc., Image-Pro premier) to calculate the proportion (%) of the area of parts filled with the resin in the total area of parts of the positive electrode active material (or the negative electrode active material) and the parts filled with the resin in the positive electrode plate (or the negative electrode plate) (parts which had been pores originally) as the porosity (%) of the positive electrode plate (or the negative electrode plate). The threshold in the binarization was set by using the Otsu's binarization as a discriminant analysis method. The porosity of the positive electrode plate was as indicated in Table 2, and the porosity of the negative electrode plate was 38%.

(5b) Measurement of the Mean Pore Diameter

By using the SEM image used in the above porosity measurement, the mean pore diameter was measured as follows. By using image analysis software (manufactured by Media Cybernetics, Inc., Image-Pro premier), a binarization process was carried out to divide parts of the positive electrode active material (or the negative electrode active material) from parts filled with a resin (parts which had been pores originally) in the positive electrode plate (or the negative electrode plate). Thereafter, the maximum Martin diameter in each region in regions of the parts filled with a resin was determined and the mean value thereof was defined as the mean pore diameter (µm) of the positive electrode plate (or the negative electrode plate). The mean pore diameter of the positive electrode plate was as indicated in Table 2; and the mean pore diameter of the negative electrode plate was 2.1 µm.

(5c) Measurement of the Interfacial Length per 1 µm² of Unit Cross-Sectional Area By using the SEM image used in the above porosity measurement, the interfacial length per 1 µm² of unit cross-sectional area was measured as follows. By using image analysis software (manufactured by Media Cybernetics, Inc., Image-Pro Premier), a binarization process was carried out to divide parts of the positive electrode active material from parts filled with a resin (parts which had been pores originally) in the positive electrode plate and then determine the perimeter of all regions (that is, the total length of the interfaces between the parts of the positive electrode active material and the parts filled with a resin) in regions of the parts filled with a resin, and the area of all analyzed regions (that is, regions composed of both of the parts of the positive electrode active material and the parts filled with a resin). The perimeter was divided by the area of the whole analyzed region to obtain a quotient as the interfacial length (µm) per 1 µm² of unit cross-sectional area. The result is shown in Table 2.

(5d) Measurement of the Molar Ratio of Metal Elements in the Positive Electrode Plate The molar ratio Li/(Ni+Co+Mn) of the Li content in the positive electrode plate prepared in the above (1) to the total content of Ni, Co and Mn was calculated from the measurement result of metal element analysis by inductively coupled plasma atomic emission spectrometry (ICP-AES method). The result is shown in Table 2.

(5e) Identification of the Solid Electrolyte by XRD

The LiOH·Li$_2$SO$_4$-based solid electrolyte obtained in the above (3c) was analyzed by X-ray diffraction (XRD), and was identified as 3LiOH·Li$_2$SO$_4$.

(5f) Evaluation of the Charge/Discharge

For the battery prepared in the above (4), the discharge capacity of the battery at an operating temperature of 150° C. was measured in the voltage range of 2.5 V to 1.5 V. The measurement was carried out by carrying out constant current/constant voltage charging until the battery voltage reached the upper limit of the above voltage range and carrying out discharging until the battery voltage reached the lower limit thereof. The result is shown as a relative value with respect to another Example described later.

Example 2

A positive electrode plate and a battery were prepared and various evaluations were carried out, as in Example 1, except for 1) using an NCM mixed powder B containing the NCM raw material powders 1 and 3 in a blend proportion (in weight ratio) of 90:10 indicated in Table 1 in place of the mixed powder A in the preparation of the positive electrode plate of the above (1), and 2) altering the firing temperature therein to 950° C.

Example 3

A positive electrode plate and a battery were prepared and various evaluations were carried out, as in Example 1, except for 1) using an NCM mixed powder C containing the NCM raw material powders 5 and 6 in a blend proportion (in weight ratio) of 90:10 indicated in Table 1 in place of the mixed powder A in the preparation of the positive electrode plate of the above (1), and 2) altering the firing temperature therein to 920° C.

Example 4

A positive electrode plate and a battery were prepared and various evaluations were carried out, as in Example 3, except for altering the firing temperature in the preparation of the positive electrode plate of the above (1) to 950° C.

Example 5

A positive electrode plate and a battery were prepared and various evaluations were carried out, as in Example 1, except for 1) using an NCM mixed powder D containing the NCM raw material powders 5 and 6 in a blend proportion (in weight ratio) of 95:5 indicated in Table 1 in place of the mixed powder A in the preparation of the positive electrode plate of the above (1), and 2) altering the firing temperature therein to 920° C.

Example 6

A positive electrode plate and a battery were prepared and various evaluations were carried out, as in Example 5, except for altering the firing temperature in the preparation of the positive electrode plate of the above (1) to 950° C.

Example 7

A positive electrode plate and a battery were prepared and various evaluations were carried out, as in Example 1, except for 1) using an NCM mixed powder E containing the NCM raw material powders 5 and 7 in a blend proportion (in weight ratio) of 95:5 indicated in Table 1 in place of the mixed powder A in the preparation of the positive electrode plate of the above (1), and 2) altering the firing temperature therein to 920° C.

Example 8

A positive electrode plate and a battery were prepared and various evaluations were carried out, as in Example 7, except for altering the firing temperature in the preparation of the positive electrode plate of the above (1) to 950° C.

Example 9

A positive electrode plate and a battery were prepared and various evaluations were carried out, as in Example 1, except for 1) using an NCM mixed powder F containing the NCM raw material powders 5 and 8 in a blend proportion (in weight ratio) of 90:10 indicated in Table 1 in place of the mixed powder A in the preparation of the positive electrode plate of the above (1), and 2) altering the firing temperature therein to 950° C.

Example 10

A positive electrode plate and a battery were prepared and various evaluations were carried out, as in Example 1, except for 1) using an NCM mixed powder G containing the NCM raw material powders 5 and 8 in a blend proportion (in weight ratio) of 95:5 indicated in Table 1 in place of the mixed powder A in the preparation of the positive electrode plate of the above (1), and 2) altering the firing temperature therein to 950° C.

Example 11

A positive electrode plate and a battery were prepared and various evaluations were carried out, as in Example 10, except for altering the firing temperature in the preparation of the positive electrode plate of the above (1) to 970° C.

Example 12 (Comparative)

A positive electrode plate and a battery were prepared and various evaluations were carried out, as in Example 1, except for 1) using the NCM raw material powder 4 in Table 1 alone in place of the mixed powder A in the preparation of the positive electrode plate of the above (1), and 2) altering the firing temperature therein to 920° C.

Example 13 (Comparative)

A positive electrode plate and a battery were prepared and various evaluations were carried out, as in Example 1, except for 1) using the NCM raw material powder 9 in Table 1 alone in place of the mixed powder A in the preparation of the positive electrode plate of the above (1), and 2) altering the firing temperature therein to 920° C.

Example 14 (Comparative)

A positive electrode plate and a battery were prepared and various evaluations were carried out, as in Example 1, except for 1) using the NCM raw material powder 10 in Table 1 alone in place of the mixed powder A in the preparation of the positive electrode plate of the above (1), and 2) altering the firing temperature therein to 890° C.

Example 15 (Comparative)

A positive electrode plate and a battery were prepared and various evaluations were carried out, as in Example 14, except for altering the firing temperature in the preparation of the positive electrode plate of the above (1) to 920° C.

Results

Table 2 shows the specification of the positive electrode plate prepared in each Example and evaluation results of the cell therein. Here, the charge/discharge characteristic was compared under the same rate condition and the discharge capacity measured in Example 13 (Comparative) was taken to be 100, and the relative value with respect to this was calculated and is shown in Table 2.

TABLE 1

| | Raw material powder | Blend proportion of raw material powders in each mixed powder (% by weight) | | | | | | |
|---|---|---|---|---|---|---|---|---|
| | | A | B | C | D | E | F | G |
| 1 | NCM523 powder of 8 μm in volume base D50 particle size, obtained by mixing a $(Ni_{0.5}Co_{0.2}Mn_{0.3})(OH)_2$ powder and a $Li_2CO_3$ powder weighed to give a molar ratio of Li/(Ni + Co + Mn) being 1.15, and then firing the mixture at 750° C. | 80 | 90 | — | — | — | — | — |
| 2 | NCM523-containing powder obtained by adding 2.45% by weight (blend-inclusive) of $Li_3BO_3$ to the raw material powder 1 and regulating the volume base D50 particle size to 0.4 μm | 20 | — | — | — | — | — | — |
| 3 | NCM523-containing powder obtained by adding 9.2 wt % (blend-inclusive) of $Li_3BO_3$ to the raw material powder 1 and regulating the volume base D50 particle size to 0.4 μm | — | 10 | — | — | — | — | — |
| 4 | NCM523 powder obtained by regulating the volume base D50 particle size of the raw material powder 1 to 5.5 μm | — | — | — | — | — | — | — |
| 5 | NCM361 powder of 6.5 μm in volume base D50 particle size, obtained by mixing a $(Ni_{0.3}Co_{0.6}Mn_{0.1})(OH)_2$ powder and the $Li_2CO_3$ powder weighed to give a molar ratio of Li/(Ni + Co + Mn) being 1.15, and then firing the mixture at 850° C. | — | — | 90 | 95 | 95 | 90 | 95 |
| 6 | NCM361-containing powder obtained by adding 9.2 wt % (blend-inclusive) of $Li_3BO_3$ to the raw material powder 5 and regulating the volume base D50 particle size to 0.4 μm | — | — | 10 | 5 | — | — | — |
| 7 | NCM361-containing powder obtained by adding 16.8 wt % (blend-inclusive) of $Li_3BO_3$ to the raw material powder 5 and regulating the volume base D50 particle size to 0.4 μm | — | — | — | — | 5 | — | — |
| 8 | NCM361 powder obtained by regulating the volume base D50 particle size of the raw material powder 5 to 0.4 μm | — | — | — | — | — | 10 | 5 |
| 9 | NCM361 powder obtained by regulating the volume base D50 particle size of the raw material powder 5 to 4.3 μm | — | — | — | — | — | — | — |
| 10 | NCM361 powder obtained by mixing the $(Ni_{0.3}Co_{0.6}Mn_{0.1})(OH)_2$ powder and the $Li_2CO_3$ powder weighed to give a molar ratio of Li/(Ni + Co + Mn) being 1.15, and then firing the mixture at 950° C., and regulating the volume base D50 particle size to 1.9 μm | — | — | — | — | — | — | — |

The "NCM523" means $Li(Ni_{0.5}Co_{0.2}Mn_{0.3})(O)_2$, and the "NCM361" means $Li(Ni_{0.3}Co_{0.6}Mn_{0.1})O_2$. The "% by weight (blend-inclusive)" means a weight percentage of a powder added when the total amount of a mixture after the addition is taken to be 100% by weight

TABLE 2

| | Positive electrode plate | | | | | Discharge capacity (Relative value in the case where the discharge capacity of Example 13 is taken to be 100) |
| | Porosity (%) | Mean pore diameter (μm) | Interfacial length per 1 μm² of unit cross-sectional area (μm) | Molar ratio Li/(Ni + Co + Mn) | Thickness (μm) | |
|---|---|---|---|---|---|---|
| Example 1 | 30 | 4.5 | 0.26 | 1.03 | 100 | 268 |
| Example 2 | 32 | 5.1 | 0.21 | 0.99 | 100 | 277 |
| Example 3 | 36 | 3.5 | 0.37 | 1.02 | 80 | 350 |
| Example 4 | 35 | 4.3 | 0.31 | 1.01 | 80 | 332 |
| Example 5 | 39 | 4.2 | 0.32 | 1.06 | 80 | 227 |
| Example 6 | 33 | 5.5 | 0.27 | 1.00 | 80 | 395 |
| Example 7 | 28 | 4.6 | 0.26 | 1.03 | 80 | 386 |
| Example 8 | 20 | 5.6 | 0.18 | 1.00 | 80 | 382 |
| Example 9 | 27 | 3.9 | 0.33 | 1.06 | 80 | 241 |
| Example 10 | 37 | 3.5 | 0.42 | 1.00 | 80 | 132 |
| Example 11 | 29 | 3.8 | 0.35 | 1.00 | 80 | 123 |
| Example 12* | 33 | 2.5 | 0.42 | 1.04 | 100 | 14 |
| Example 13* | 27 | 1.9 | 0.66 | 1.00 | 80 | 100 |
| Example 14* | 33 | 1.7 | 1.14 | 1.02 | 80 | 77 |
| Example 15* | 28 | 1.8 | 0.92 | 1.00 | 80 | 36 |

*represents Comparative Example

The batteries of Examples 1 to 11 each using the lithium composite oxide sintered plate meeting the requirement of the present invention exhibited significantly higher discharge capacities as compared with the batteries of Examples 12 to 15 (comparative) not meeting the requirement of the present invention. It is considered that this was caused by the fact that shortening the interfacial length short reduced the situation where the positive electrode layer and the solid electrolyte caused side reactions, and that larger mean pore diameter increased the solid electrolyte part (solid electrolyte part at distances apart from the interface) that is less susceptible to deterioration by side reactions. It is considered that the reduction of the Li ionic conduction due to the deterioration of the solid electrolyte is thus alleviated, leading to the great improvements in the rate characteristic and the discharge capacity.

What is claimed is:

1. A lithium composite oxide sintered plate to be used for a positive electrode of a lithium ion secondary battery, wherein the lithium composite oxide sintered plate is composed of a lithium composite oxide having a layered rock salt structure containing Li, Ni, Co and Mn, and has:
   a porosity of 20 to 40%,
   a mean pore diameter of 3.5 μm or larger, and
   an interfacial length per 1 μm² of unit cross-sectional area of 0.45 μm or shorter.

2. The lithium composite oxide sintered plate according to claim 1, wherein the interfacial length per 1 μm² of unit cross-sectional area is 0.10 to 0.40 μm.

3. The lithium composite oxide sintered plate according to claim 1, wherein the porosity is 20 to 36%.

4. The lithium composite oxide sintered plate according to claim 1, wherein the mean pore diameter is 3.5 to 15.0 μm.

5. The lithium composite oxide sintered plate according to claim 1, wherein the lithium composite oxide sintered plate has a thickness of 30 to 300 μm.

6. The lithium composite oxide sintered plate according to claim 1, wherein a molar ratio of Li/(Ni+Co+Mn) in the lithium composite oxide is 0.95 to 1.10.

7. An all-solid-state secondary battery, comprising:
   a positive electrode layer containing the lithium composite oxide sintered plate according to claim 1;
   a negative electrode layer containing a negative electrode active material; and
   a LiOH·Li$_2$SO$_4$-based solid electrolyte interposed as a separator between the positive electrode layer and the negative electrode layer and filled also in pores of the lithium composite oxide sintered plate.

8. The all-solid-state secondary battery according to claim 7, wherein the negative electrode active material is Li$_4$Ti$_5$O$_{12}$.

9. The all-solid-state secondary battery according to claim 7, wherein the LiOH·Li$_2$SO$_4$-based solid electrolyte is filled also in pores of the negative electrode layer.

10. The all-solid-state secondary battery according to claim 7, wherein the LiOH·Li$_2$SO$_4$-based solid electrolyte comprises a solid electrolyte identified to be 3LiOH·Li$_2$SO$_4$ by X-ray diffraction.

* * * * *